(12) United States Patent
Averi et al.

(10) Patent No.: US 10,574,701 B1
(45) Date of Patent: Feb. 25, 2020

(54) NETWORK SECURITY POLICIES USING CUSTOM ATTRIBUTES

(71) Applicant: Cisco Technology, Inc., San Jose, CA (US)

(72) Inventors: John E. Averi, Cary, NC (US); Miner H. Gleason, III, Cary, NC (US); Brandon L. New, Cary, NC (US); Alan U. Lopez, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 15/484,191

(22) Filed: Apr. 11, 2017

(51) Int. Cl.
*H04L 29/06* (2006.01)
*G06F 9/455* (2018.01)

(52) U.S. Cl.
CPC .......... *H04L 63/20* (2013.01); *G06F 9/45558* (2013.01); *H04L 63/101* (2013.01); *H04L 63/1416* (2013.01); *G06F 2009/45587* (2013.01)

(58) Field of Classification Search
CPC ... H04L 63/20; H04L 63/101; H04L 63/1416; G06F 9/45558; G06F 2009/45587
See application file for complete search history.

(56) References Cited

U.S. PATENT DOCUMENTS

| 7,249,374 B1 * | 7/2007 | Lear .................. G06F 21/31 709/203 |
| 8,010,991 B2 | 8/2011 | Sarukkai et al. |
| 8,516,241 B2 | 8/2013 | Chang et al. |
| 8,990,885 B2 | 3/2015 | Chang et al. |
| 9,461,968 B2 | 10/2016 | Chang et al. |
| 2013/0246639 A1 * | 9/2013 | Nedbal ................ H04L 63/101 709/228 |

* cited by examiner

*Primary Examiner* — Mohammed Waliullah
(74) *Attorney, Agent, or Firm* — Edell, Shapiro & Finnan, LLC

(57) ABSTRACT

A computer-implemented method is provided for a security platform to implement network service policies based on custom attributes assigned to endpoints. An attribute agent on the security platform monitors at least one custom attribute and corresponding attribute value associated with endpoints. The security platform generates a host map associating a network address of each endpoint with one or more of the custom attributes and corresponding attribute values. The security platform determines network access policies based on at least one custom attribute and corresponding attribute value. The security platform generates an access control list based on the network access policies and the host map, and implements the access control list to control network traffic between the endpoints.

20 Claims, 13 Drawing Sheets

500

Add VM Attribute Agent — 510

Agent Name: vmagent

Agent Type: esxi — 515

Host Information

☑ Enable IP address and authentication credential

DNS Host name/IP Address: 10.122.202.217 — 520

User Name: root

Password Type: Clear Text ▼

Password: 12345luggage

} 525

Keepalive Information

Retry Interval: 30 (1 - 65535) — 532

Retry Count: 3 (1 - 32) — 534

530 {

OK  Cancel  Help

FIG.5

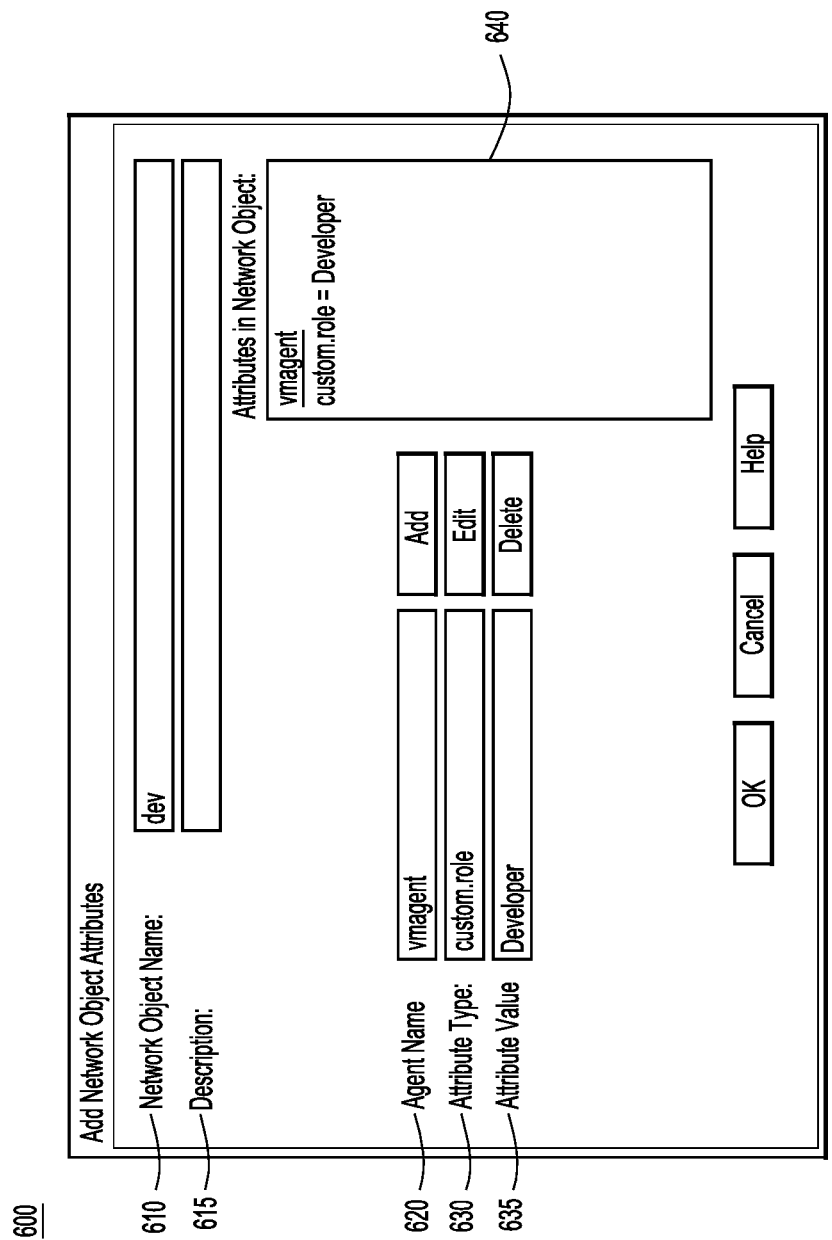

700

```
Add Access Rule

Interface:  [Management ▼]
  Action:     ⦿ Permit  ○ Deny
  Source Criteria ─────────────────────────
    Source:        [build                    ]
    User:          [                         ]
    Security Group:[                         ]

Destination Criteria ────────────────────
    Destination:   [dev                      ]
    Security Group:[                         ]
    Service:       [ip                       ]

Description:   [                         ]
                   [                         ]

☑ Enable Logging
    Logging Level: [Default  ▼]

[More Options                           ▼]

[ OK ]  [ Cancel ]  [ Help ]
```

710 → Interface
720 → Action
730 → Source Criteria
740 → Destination Criteria

| NETWORK ADDRESS | SOURCE | ATTRIBUTE | VALUE |
|---|---|---|---|
| 169.254.107.176 | vmagent | custom.role | DEVELOPER |
| 169.254.107.176 | vmagent | custom.project | ALPHA |
| 169.254.59.151 | vmagent | custom.role | DEVELOPER |
| 10.15.28.34 | vmagent | custom.role | DEVELOPER |
| 10.15.28.32 | vmagent | custom.role | DEVELOPER |
| 10.15.28.31 | vmagent | custom.role | TESTER |
| 10.15.27.133 | vmagent | custom.role | BUILD |
| 10.15.27.135 | vmagent | custom.role | BUILD |
| 10.15.27.134 | vmagent | custom.role | BUILD |

Columns: 802, 808, 804, 806
Rows: 810, 820, 830, 840, 850, 860, 870, 880, 890

| | SOURCE (902) | DESTINATION (904) | RULE (906) |
|---|---|---|---|
| 910 | 169.254.107.176 | 10.15.27.133 | PERMIT |
| 912 | 169.254.107.176 | 10.15.27.135 | PERMIT |
| 914 | 169.254.107.176 | 10.15.27.134 | PERMIT |
| 920 | 169.254.59.151 | 10.15.27.133 | PERMIT |
| 922 | 169.254.59.151 | 10.15.27.135 | PERMIT |
| 924 | 169.254.59.151 | 10.15.27.134 | PERMIT |
| 930 | 10.15.28.34 | 10.15.27.133 | PERMIT |
| 932 | 10.15.28.34 | 10.15.27.135 | PERMIT |
| 934 | 10.15.28.34 | 10.15.27.134 | PERMIT |
| 940 | 10.15.28.32 | 10.15.27.133 | PERMIT |
| 942 | 10.15.28.32 | 10.15.27.135 | PERMIT |
| 944 | 10.15.28.32 | 10.15.27.134 | PERMIT |
| 950 | 10.15.28.31 | 10.15.27.133 | DENY |
| 952 | 10.15.28.31 | 10.15.27.135 | DENY |
| 954 | 10.15.28.31 | 10.15.27.134 | DENY |

FIG.9

NETWORK SECURITY POLICIES USING CUSTOM ATTRIBUTES

TECHNICAL FIELD

The present disclosure relates to implementing network access policies.

BACKGROUND

Network security policies typically are implemented using methods such as Access Control Lists (ACLs) that depend on identifying target hosts by network characteristics, such as Internet Protocol (IP) addresses. In a virtualized environment, virtual machines may be created and moved dynamically, and network security policies are added/changed/deleted to match a particular virtual machine's current role and network characteristics as defined by the owner of the virtual machine. Some virtualized environments allow users to configure custom tags to provide information about virtual machines, but the values of the tags are typically only accessible through the management platform of the virtual machines. Other virtualized environments allow a security gateway to retrieve a limited set of fixed attributes of virtual machines, but do not allow the virtual machines to define custom attributes.

BRIEF DESCRIPTION OF THE DRAWINGS

FIG. 5 is a simulated screenshot of an agent creation window to create a security agent that monitors custom attributes in virtual machines, according to an example embodiment.

FIG. 6 is a simulated screenshot of a network object creation window to create a network object used by a security agent to generate a security policy, according to an example embodiment.

FIG. 7 is a simulated screenshot of an access rule creation window to create a network security policy based on network objects associated with custom attributes, according to an example embodiment.

FIG. 8 is a host map associating network addresses of virtual machines with custom attributes and values, according to an example embodiment.

FIG. 9 is an Access Control List implementing the network security policy based on the custom attributes of virtual machines, according to an example embodiment.

DESCRIPTION OF EXAMPLE EMBODIMENTS

Overview

Figure 1:
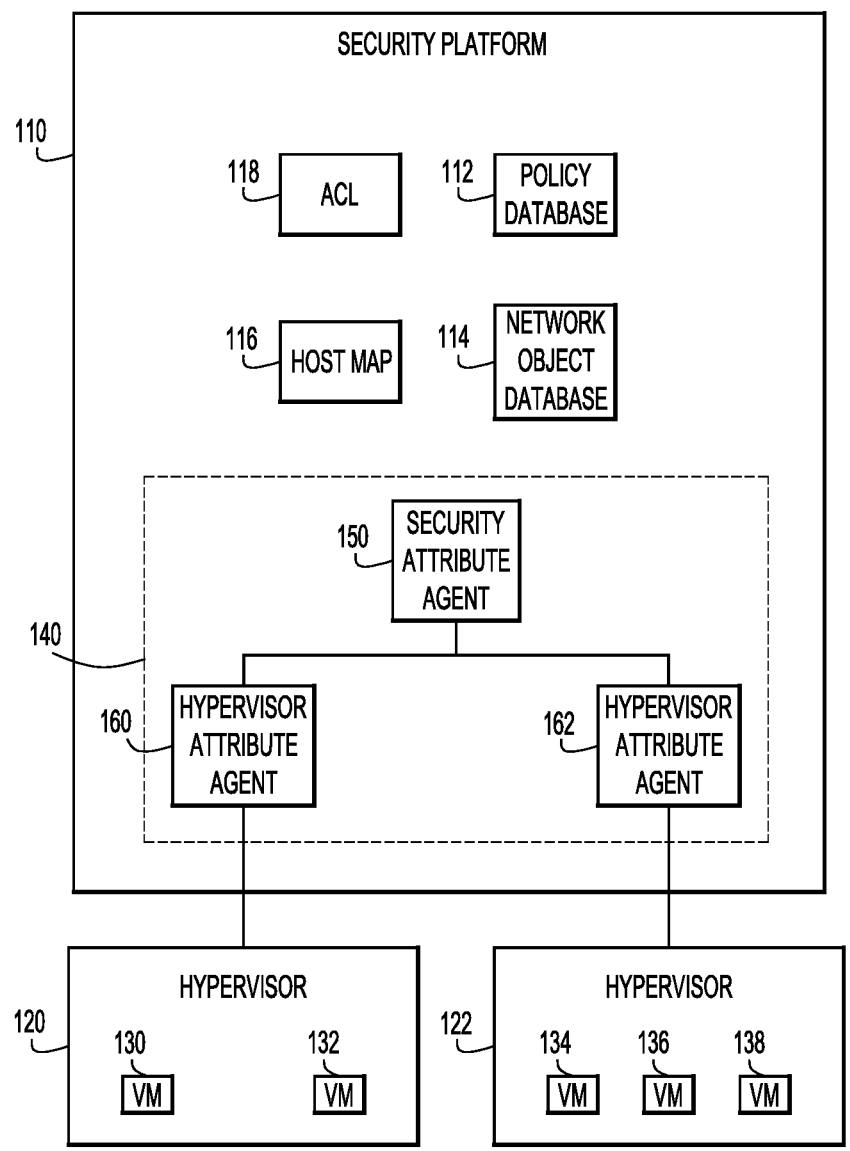
FIG. 1 is a simplified block diagram of a system to implement network security policies based on custom attributes of virtual machines, according to an example embodiment.

In one embodiment, a computer-implemented method is provided for a security device to implement network service policies based on custom attributes assigned to endpoints. The method includes monitoring at least one custom attribute and corresponding attribute value associated with one or more endpoints. The security device generates a host map associating a network address of each endpoint with one or more of the custom attributes and corresponding attribute values. The security device determines network access policies based on the at least one custom attribute and corresponding attribute value. The security device generates an access control list based on the network access policies and the host map, and implements the access control list to control network traffic between the one or more endpoints.

DETAILED DESCRIPTION

The techniques presented herein allow a user to define network security policies based on virtual machine attributes of their own choosing, and dynamically categorize the host virtual machines according to these custom attributes. The network security policies are based on the custom attributes, which are known to both the virtual machine and the security infrastructure, rather than being based on addressing information, which is ephemeral and under the control of the networking systems. The security platform can apply network security policies to a class of virtual machines without requiring the security platform to be aware of the current network characteristics of individual virtual machines.

In a general example, the virtual environment may include a hypervisor managing one or more host servers providing a virtual environment (e.g., VMware ESXi server or server cluster), a set of managed objects (e.g., virtual machines), a set of custom attributes relevant to security policies that may be defined by a user and associated with individual managed objects, an administration platform that monitors the relationship between the attributes of a managed object and its network address (e.g., VMware vCenter), and a security platform or appliance that uses access control lists to manage network traffic policies (e.g., Cisco® ASA/ASAv9.7.1). Each managed object may be configured with custom attribute information in a user-defined field, which is monitored by the administration platform, but not necessarily interpreted by the administration platform. The security platform monitors a set of attribute types and expected values, as well as assigned security policies related to the attribute type/value pairs.

The security platform registers with the administration platform to receive notifications whenever the user-defined field is created or modified. When the custom attributes associated with the managed object change, the contents of the user-defined field are bound to the network information and transmitted to the security platform. The security platform parses the user-defined field to extract the managed object's network information (e.g., IP address, subnet, Virtual Local Area Network (VLAN), etc.) and the custom attribute type/value information. This network information and attribute information is stored, and any network traffic with matching network information is filtered according to the security policies matching the attribute information.

The custom attributes of the managed objects may be defined inside an existing, user-defined field (e.g., a Notes field) using a platform independent format (e.g., eXtensible Markup Language (XML)). The existing Notes field may contain the attribute type and value associated with the managed object. The contents of the existing Notes field are not interpreted by the administration platform, but are simply transmitted to the security platform, which decodes the custom attribute data to determine the binding information between the attribute type/value and the network information of the managed object. Since the administrative platform merely passes the content of the Notes field to the security platform, the custom attribute information in the Notes field may be encrypted, e.g., with a key known only to the managed object and the security platform, but not the administrative platform.

Referring now to FIG. 1, a simplified block diagram of a network security policy system 100 based on custom attributes is shown. The network security policy system 100 includes a security platform 110, which may be embodied by one or more computing devices configured to implement network security policies based on custom attributes. The security platform 110 includes a policy database 112, a network object database 114, a host map 116, and an Access Control List (ACL) 118. The policy database 112 includes entries that associate network rules (e.g., permit, deny, etc.) for network traffic between network objects. The network object database includes entries that associate the network objects used in the network policies with custom attributes/values. The host map 116 associates network addresses of hosts with the custom attributes/values. The ACL 118 implements the network policies specified in the policy database 112 on network traffic between the hosts with network addresses specified in the host map 116.

The system 100 also includes hypervisors 120 and 122 that serve as the administrative platform for virtual machines 130, 132, 134, 136, and 138. The hypervisor 120 manages the virtual machines 130 and 132, and the hypervisor 122 manages the virtual machines 134, 136, and 138. Other deployments of the system 100 may include more or fewer hypervisors. Each hypervisor may also manage different numbers of virtual machines. Additionally, the security platform 110 may be implemented on one or more virtual machines managed by a hypervisor.

The security platform 110 generates an attribute agent 140 to monitor the custom attributes of the virtual machines 130, 132, 134, 136, and 138. The attribute agent may be divided into a security attribute agent 150 and two hypervisor attribute agents 160 and 162. In one example, the security attribute agent 150 handles commands from the security platform, issues keepalive messages to the hypervisors, generates monitor requests to the hypervisor attribute agents 160 and 162, and reports binding updates to the data plane network object code. Typically, there is only one security attribute agent 150 in the system 100. The hypervisor attribute agents 160 and 162 may include information to log in to the hypervisors 120 and 122, respectively, and send binding updates to the security attribute agent 150. Each hypervisor attribute agent communicates with one hypervisor, and the system 100 includes as many hypervisor attribute agents as hypervisors.

In another example, attribute requests and binding updates exchanged between the hypervisor attribute agent 160 and the hypervisor 120 are sent securely as Hypertext Transfer Protocol Secure (HTTPS) packets. The keepalive messages between the security attribute agent 150 and the hypervisor 160 may be sent as empty Hypertext Transfer Protocol (HTTP) requests. Messages between the hypervisor attribute agent 160 and the security attribute agent 150 may be sent via named pipes.

In a further example, the hypervisors 120 and 122 may be considered as separate administrative platforms for their respective virtual machines. However, the administrative platforms 120 and 122 may be implemented as two entities on the same hypervisor. Additionally, the security platform 110 may also be implemented as another entity on either the hypervisor 120, the hypervisor 122, or as a third entity on the combined hypervisor for the administrative platforms 120 and 122. In general, the functions of the security platform 110, the hypervisor 120, and the hypervisor 122 may be performed on the same or different physical computing devices to implement the system 100.

Figure 2A:
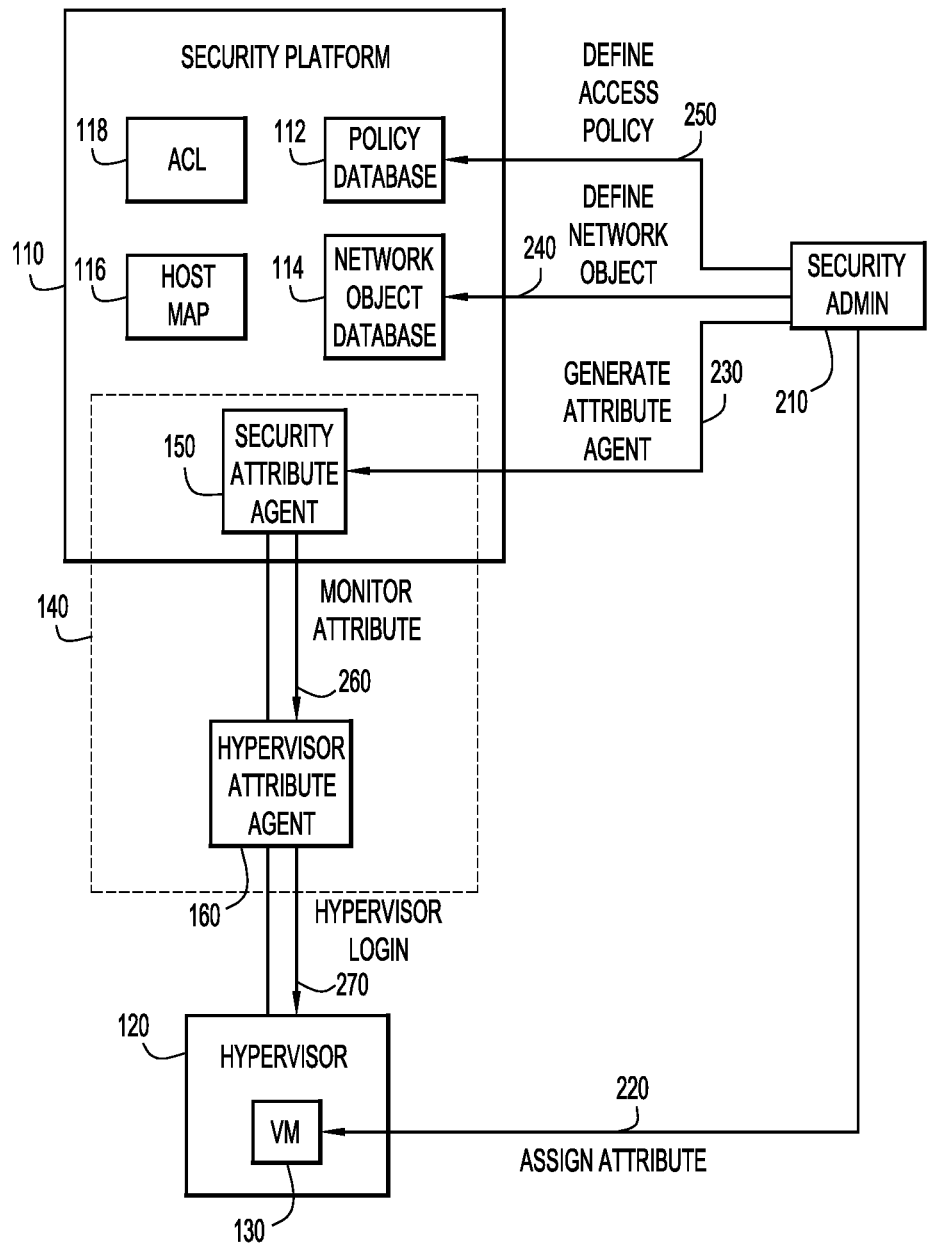
FIG. 2A is a block diagram showing a security administrator installing a security agent to monitor custom attributes in a virtual machine, according to an example embodiment.

Referring now to FIG. 2A, a simplified block diagram illustrates how a user configures the system 100 to begin implementing network security policies based on custom attributes. A security administrator 210 assigns a custom attribute and a value for the custom attribute to the virtual machine 130 in a message 220. The security administrator 210 may assign one or more custom attributes and corresponding attribute values through an existing, user-defined field in the configuration of the virtual machine 130.

The security administrator 210 sends a message 230 to instruct the security platform 110 to generate the attribute agent 140 (i.e., the security attribute agent 150 and the hypervisor attribute agent 160). The security administrator 210 defines one or more network objects in the network object database 114 of the security platform 110 through message 240. Each network object in the network object database 114 is associated with an attribute/value from an attribute agent. The security administrator 210 defines network security policies in the policy database 112 of the security platform 110 through message 250. The network security policies in the policy database 112 define access between network objects stored in the network object database 114. For instance, a network security policy in the policy database 112 may permit or deny endpoints associated with one particular network object from communicating with endpoints associated with another network object. Additionally, network objects may be associated with endpoints, such as virtual machines in a hypervisor environment, or with network entities outside of the hypervisor environment.

After the security administrator 210 initiates the attribute agent, the security attribute agent 150 sends a message 260 to instruct the hypervisor attribute agent 160 to monitor a particular attribute in the virtual machines managed by its respective hypervisor 120. The hypervisor attribute agent 160 logs into the hypervisor 120 to monitor the particular attribute with message 270.

In one example, the security platform 110 allows the security administrator 210 to configure an attribute agent 140 with credentials (e.g., username, password, etc.) to enable the hypervisor attribute agent 160 to log into the hypervisor 120. The security platform 110 also configures one or more network objects associated with one or more attribute types and values, and creates network security policies based on the network objects. Once the security platform 110 associates hosts (e.g., virtual machines) with network objects through the host map 116, the security platform creates an ACL implementing the network security policies.

The hypervisor attribute agent 160 relays the monitor request from the security attribute agent 150 to the administration platform on the hypervisor 120, which responds with a binding update. The binding update includes a triplet comprising the attribute type, the attribute value, and the network address for any managed object (e.g., virtual machine) configured with that attribute. In one example, each binding update triplet becomes an entry in the host map 116. Each binding update that matches a defined network object in the network object database 114 is translated into an ACL for that network address. When the attribute type or value for any managed object is changed, the administration platform on the hypervisor 120 communicates an updated binding triplet via the attribute agent 140 to the security platform 110, and the security platform 110 modifies the network policy ACLs accordingly.

Figure 2B:
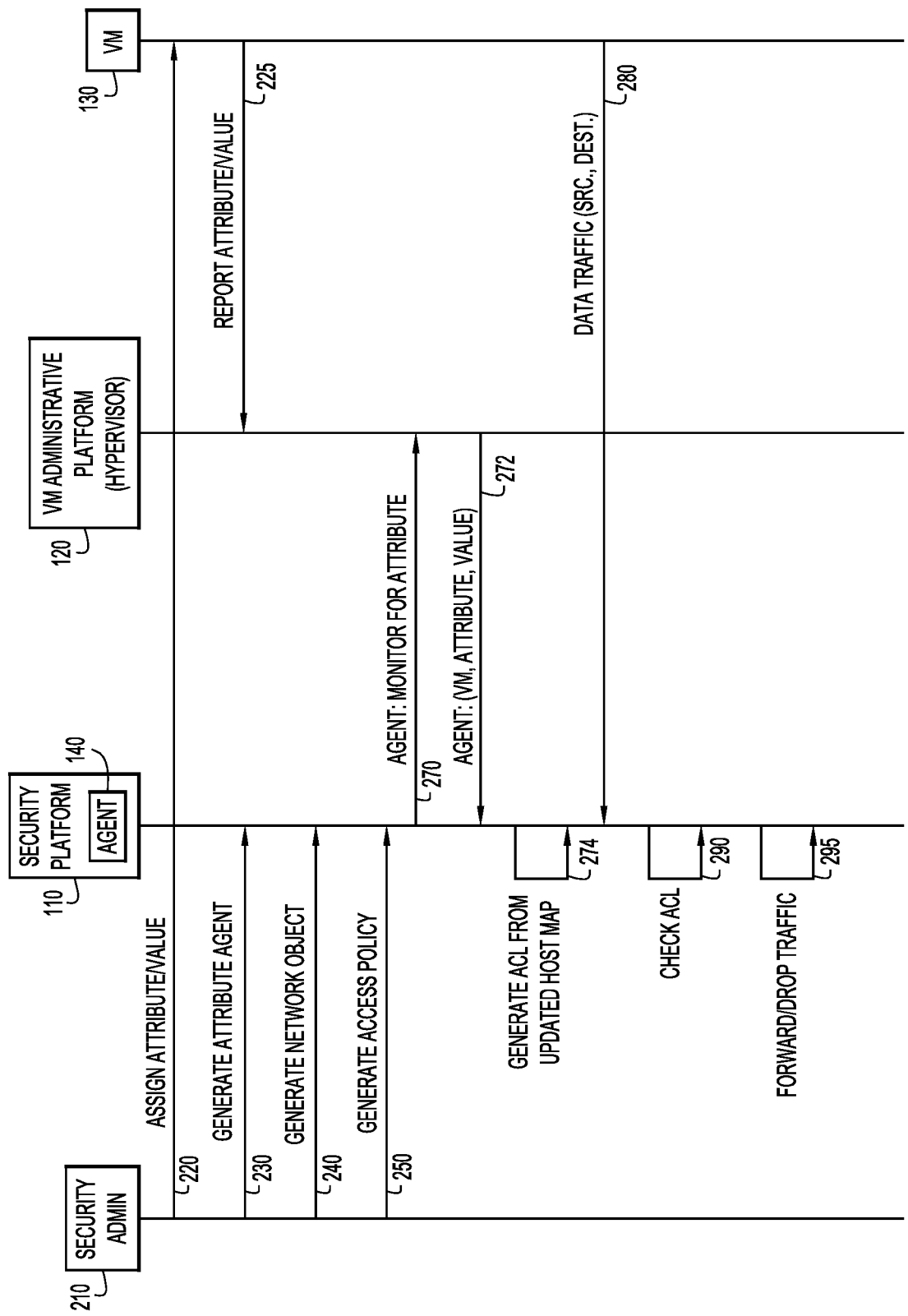
FIG. 2B is a ladder diagram illustrating messages installing a network security policy based on custom attributes of a virtual machine, according to an example embodiment.

Referring now to FIG. 2B, a ladder sequence diagram illustrates an example sequence of messages illustrating network security policies that are based on user-defined, custom attributes and values. Initially, a security administrator 210 sends a message 220 to the virtual machine 130, assigning a custom attribute type and value. The virtual machine 130 sends a message 225 to report the custom attribute and value to the administrative platform (e.g., hypervisor 120) that manages the virtual machine 130. Alternatively, the virtual machine may send the message 225 in response to a request from the administrative platform 120 to retrieve the custom attribute and value. The security administrator 210 also sends messages 220, 230, and 240 to the security platform 110 to configure the security platform 110 for implementing network security policies based on the custom attribute type/value assigned to the virtual machine 130. The message 220 instructs the security platform to generate the attribute agent 140, which monitors the administrative platform 120 for the custom attributes. The message 240 instructs the security platform 110 to generate network objects associated with the custom attribute types/values. The message 250 instructs the security platform 110 to generate network access policies that define which network objects can communicate with each other.

To monitor the virtual machine 130 for custom attributes, the agent 140 of the security platform 110 sends the message 270 to log into the administrative platform 120. The message 270 specifies which attribute type to monitor. In one example, the agent 140 continuously monitors for any virtual machine that has the specified attribute type. Alternatively, the agent 140 may send a one-time request for information (e.g., network address) on any virtual machine that currently has the specified attribute type. The administrative platform 120 responds with message 272 including an indication that the virtual machine 130 is associated that attribute type and corresponding attribute value. The indication in message 272 may comprise a triplet of the network address of the virtual machine 130, the custom attribute type assigned in message 220, and the custom attribute value assigned in message 220. At step 274, the security platform 110 generates an ACL for the network address of the virtual machine 130 based on the host map that was updated with the binding update triplet in message 272.

When the virtual machine 130 has data traffic 280 to send to a destination host, the virtual machine 130 sends the data traffic 280 to the security platform 110. At step 290, the security platform 110 checks the ACL for entries between the source address (i.e., virtual machine 130) and the destination address. Based on whether the source/destination network addresses match an ACL entry, the security platform may forward or drop the data traffic 280 at step 295.

In one example, the security administrator 210 configures the virtual machine 130 to have custom attributes by entering the following XML tag into a Notes field of the virtual machine 130:
<CustomAttributes>
<Attribute type='attribute-id1'value='attribute-value1'/>
<Attribute type='attribute-id2'value='attribute-value2'/>
</CustomAttributes>

This custom attribute information may be provided to the administrative platform as unencrypted text using an annotation text field. For instance, the annotation text field may be the summary.config.annotation ESXi attribute.

In another example, the attribute agent 140 contacts the administrative platform 120 and registers to be informed about any virtual machines configured with text in the summary.config.annotation field. In other words, the attribute agent 140 is configured to monitor virtual machines with a custom attribute type of summary.config.annotation. The attribute value is the text within the summary.config.annotation field, which the security platform 110 may parse into multiple custom attributes. Whenever the administrative platform 120 detects such a virtual machine, the attribute agent 140 issues a binding update from the administrative platform 120 including the IP address of the virtual machine, the attribute type (i.e., summary.config.annotation), and the attribute value (i.e., the text within the summary.config.annotation field). Using a standard attribute for a virtual machine to contain the custom attributes enables the security platform 110 to implement custom attributes without changing the implementation of the administrative platform 120.

The security platform 110 parses the binding update to extract the individual custom attribute types and values, and updates the host map to associate the IP address of the virtual machine with the custom attribute types and values. The security platform may automatically generate an ACL for the IP address of the virtual machine, implementing any network security policies on traffic from the virtual machine. If any of the information in the binding update changes (e.g., the attribute value, or IP address of the virtual machine), or a new virtual machine is created with the custom attribute, the attribute agent 140 sends a new binding update to the security platform 110, and the policy ACLs are changed automatically.

Figure 3A:
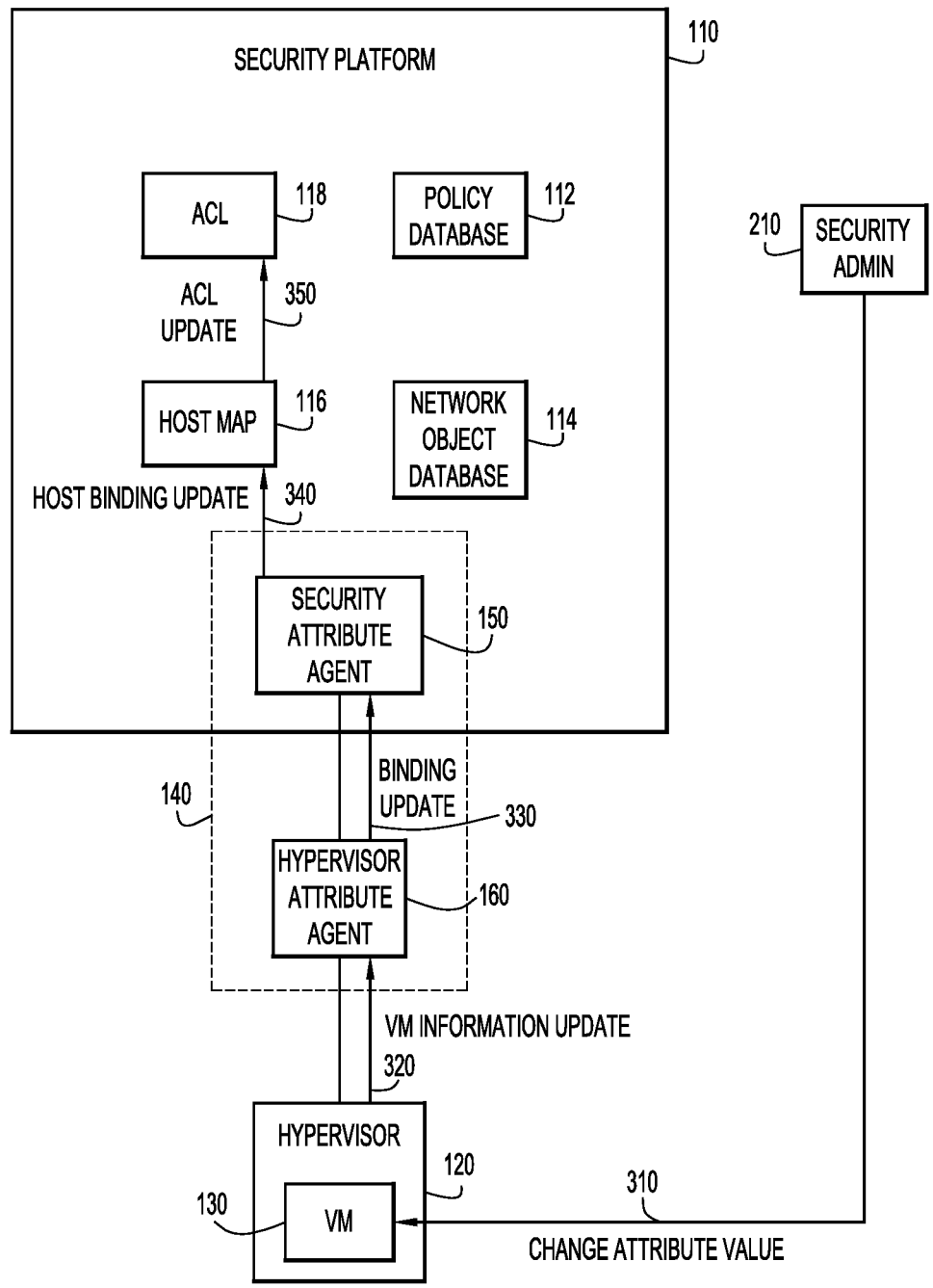
FIG. 3A is a block diagram showing a security administrator updating a custom attribute value in a virtual machine and propagating the change through to the network security policy, according to an example embodiment.

Referring now to FIG. 3A, a simplified block diagram illustrates how changes in custom attribute value are propagated from the virtual machine 130 to the security platform 110 to update the network security policies. Initially, the security administrator 210 changes an attribute value in the virtual machine 130 in message 310. The administrative platform on the hypervisor 120 incorporates the change in the custom attribute value hypervisor attribute agent 160 detects the update 320 in the information of the virtual machine 130. The hypervisor attribute agent 160 issues a binding update 330 that includes the IP address of the virtual machine, the attribute type, and the new attribute value.

The security attribute agent 150 parses the binding update 330 and enters a host binding update 340 into the host map 116. Based on the updated entry in the host map 116, the security platform generates an ACL update 350 that adds any network security policies associated with network objects based on the new attribute value. The ACL update 350 may also remove any entries in the ACL 118 from network security policies associated with network objects based on the previous attribute value.

Figure 3B:
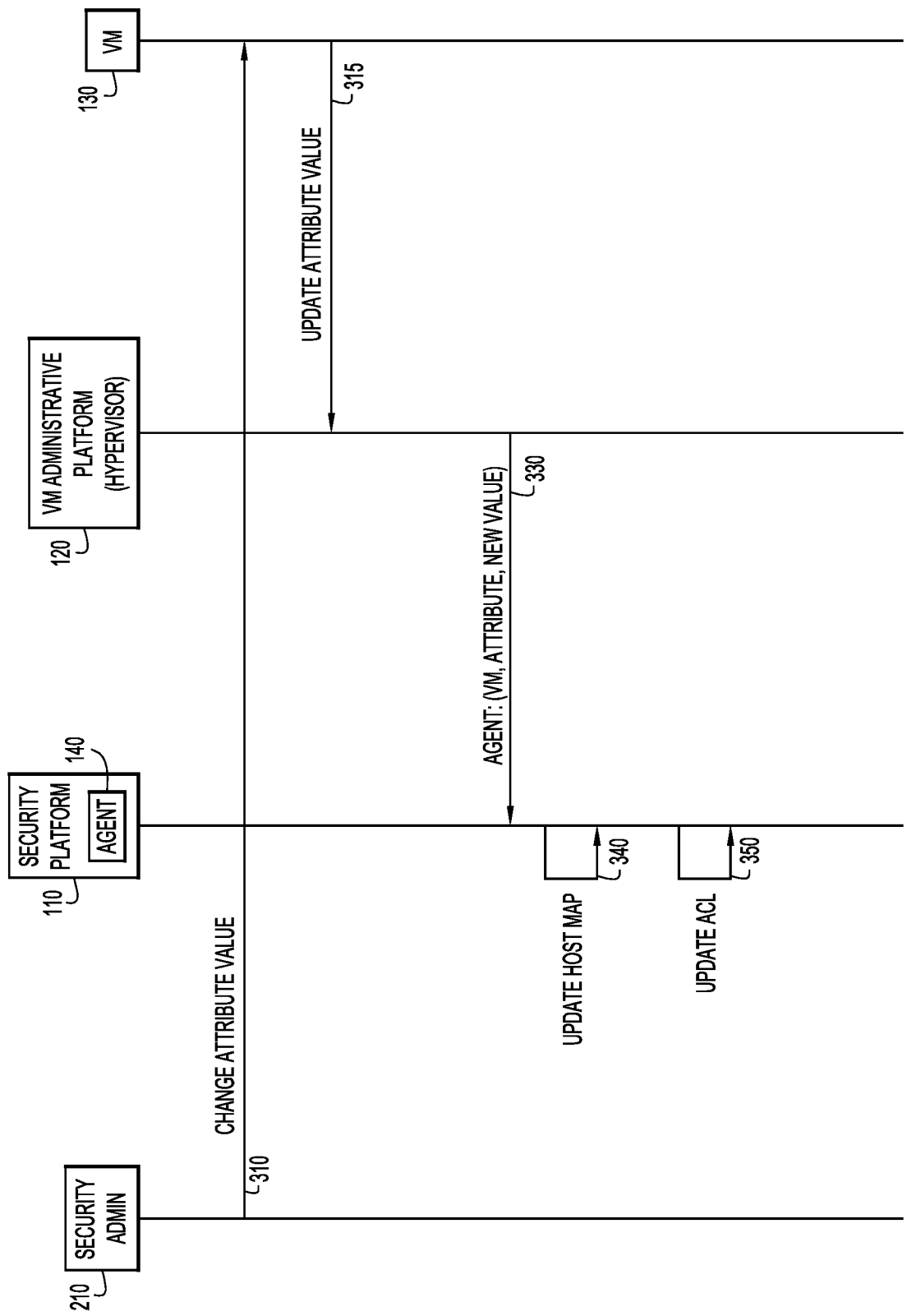
FIG. 3B is a ladder diagram illustrating messages updating a custom attribute in a virtual machine and propagating the change through to the network security policy, according to an example embodiment.

Referring now to FIG. 3B, a ladder sequence diagram illustrates an example sequence of messages propagating an update of the custom attribute of the virtual machine 130. The security administrator 210 sends a message 310 to the virtual machine 130 changing the custom attribute value. The virtual machine 130 updates the administrative platform 120 of the change in message 315. The agent 140 detects the change in attribute value and sends the binding update 330, which includes the network address of the virtual machine 130, the custom attribute type, and the new attribute value. At 340, the security platform 110 updates the host map based on the binding update 330. At 350, the security platform 110 updates the ACL to implement network security policies related to network objects associated with the new attribute value. Once the ACL is updated, any data traffic from the virtual machine 130 is automatically subject to the network security policies associated with the new attribute value.

Figure 4:
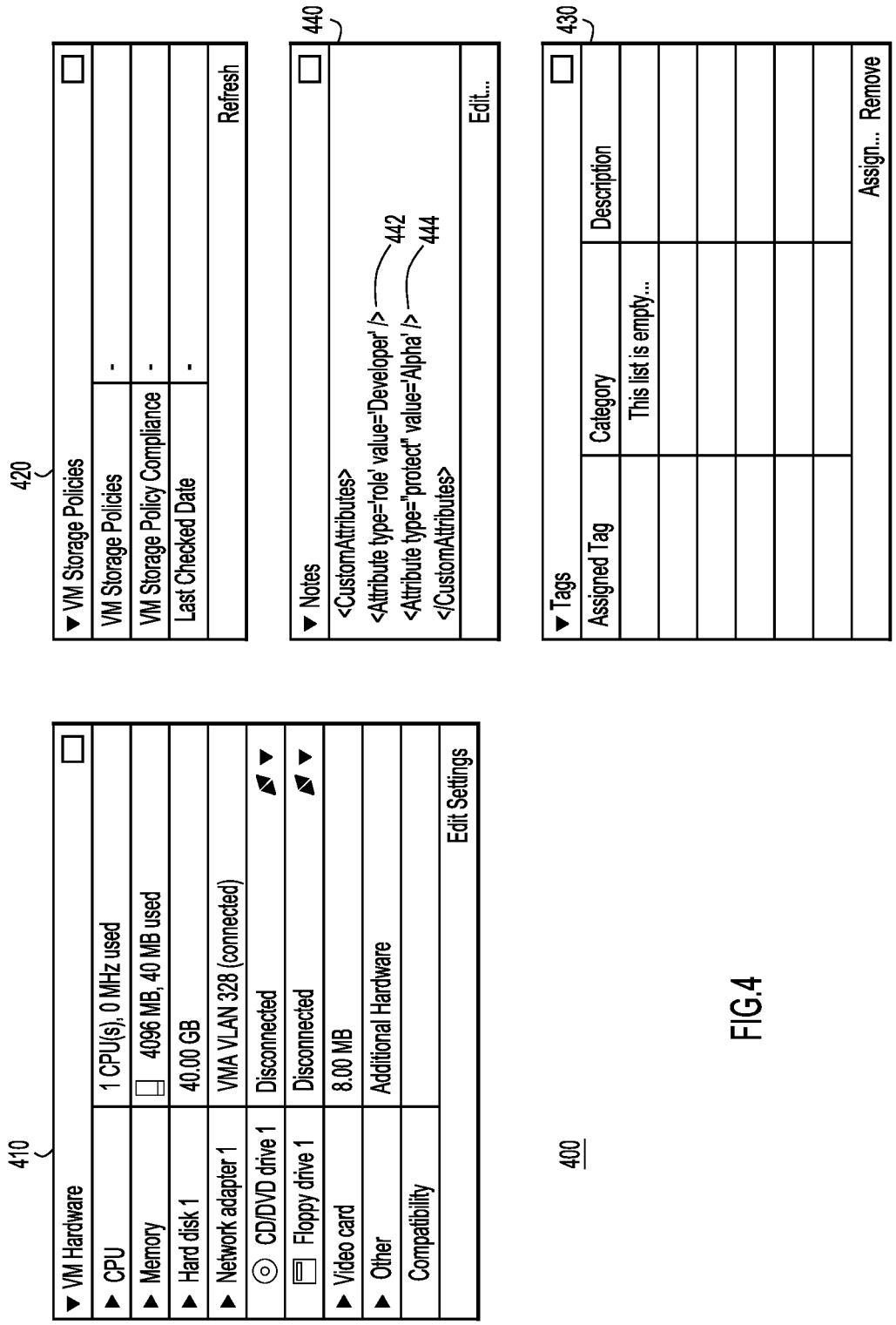
FIG. 4 is a simulated screenshot of a configuration window for a virtual machine with custom attributes, according to an example embodiment.

Referring now to FIG. 4, an example screenshot shows a graphical user interface element 400 by which a user can assign a custom attribute to a virtual machine. The element 400 includes a configuration window 410, a storage policy window 420, a Tags window 430, and a Notes window 440. The configuration window 410 shows the resources (e.g., processor, memory, storage, network interfaces, etc.) assigned to the virtual machine. The storage policy window 420 shows any administrative policies that may be applied to the storage of the virtual machine, such as restrictions on type and/or location of the storage. The Tags window 430 shows any pre-defined tags that describe the virtual machine. Since the tags in the Tags window 430 are pre-defined within the hypervisor, the hypervisor maintains visibility into any attributes associated with these pre-defined tags.

The Notes window 440 is a free form field that is typically stored by the administrative platform as user-defined text field. To add a custom attribute to the virtual machine, i.e., in contrast to the pre-defined tags in window 430, a user adds text to the Notes window 440. The user adds a custom attribute type of 'Role' with a value of 'Developer' in line 442. The user also adds a custom attribute type of 'Project' with a value of 'Alpha' in line 444. The administrative platform of the virtual machine does not parse the text within the Notes window 440, and does not receive any information from the contents of Notes window 440. In one example, the text within the Notes window 440 may be encoded and/or encrypted to actively prevent the administrative platform from learning any information from the text within the Notes window 440. As long as the security platform is able to decode/decrypt and parse the text within the Notes window 440, the administrative platform does not have any requirement to be able to parse the Notes window 440.

Though FIG. 4 shows a graphical user interface element 400 to assign custom attributes to a virtual machine, one or more command line interface commands may also be used to enable a user to assign custom attributes to the virtual machine. In other words, the graphical nature of FIG. 4 is not intended to limit the scope of the techniques described herein, and are provided as examples of one method of implementing the techniques described herein.

Referring now to FIG. 5, an example screenshot shows a graphical user interface element 500 by which a user provides information to the security platform to generate an attribute agent to monitor custom attributes in virtual machines. To generate the attribute agent (e.g., attribute agent 140), a user identifies the attribute agent with a name 510 and type 515 of agent. The element 500 includes a network address 520 of the administration platform of the virtual machines. The user also enters login information 525, such as a username and password, which enables the new attribute agent to log into the administration platform and gather information about virtual machines managed by the administration platform.

The user may also enter keepalive information 530 to maintain an active connection between the security platform on which the attribute agent is running and the administration platform. The keepalive information 530 includes a retry interval 532 indicating how often the attribute agent will attempt to contact the administration platform. A retry count 534 indicates how many times the attribute agent will attempt to contact the administrative platform before determining that the administrative platform is inaccessible. The security platform uses the keepalive mechanism to determine whether a lack of binding updates from the administrative platform is due to a lack of changes in the managed virtual machines or due to the failure of the connectivity between the security platform and administrative platform (or the failure of the administrative platform itself).

In the example depicted in FIG. 5, the element 500 allows a user to generate an ESXi attribute agent named "vmagent" that monitors virtual machines managed by a host at an IP address of 10.122.202.217. The attribute agent logs into the host with a username of "root" using a password of "12345luggage". The attribute agent will attempt to contact the host every 30 seconds, and after three unsuccessful attempts, the attribute agent determines that it is disconnected from the administrative platform. The attribute agent will continue to send keepalive messages every 30 seconds to re-establish the connection with the administrative platform.

Referring now to FIG. 6, an example screen shot shows a graphical user interface element 600 by which a user provides information to the security platform in order to add a network object associated with one or more custom attributes. The user provides a name 610 to the network object, and optionally may provide a description 615 of the network object. The new network object is associated with a particular attribute agent listed in the agent name field 620. The network object is specifically associated with the custom attribute type and attribute value listed in the type field 630 and value field 635. The network object may be associated with more than one attribute agent and custom attribute type/value, which are listed in the monitoring list 640. In the example depicted in FIG. 6, the element 600 will generate a new network object named "dev" that is associated with the attribute agent "vmagent" monitoring the custom attribute type "custom.role" with the attribute value of "Developer."

Referring now to FIG. 7, an example screen shot shows a graphical user interface element 700 by which a user provides information to the security platform in order to add a network access policy based on the network object associated with custom attributes. In the element 700 the user specifies the interface 710 (e.g., Ethernet interface) to which the access policy will be applied on the security platform, as well as an indication 720 on whether the access policy will permit network traffic or deny network traffic. In one example, the interface 710 may include any or all of the network interfaces on the security platform. The user also specifies the source criteria 730 and the destination criteria 740 for the access policy. The source criteria 730 and destination criteria 740 each includes an indication of a network object associated with a particular custom attribute type/value. Additional source criteria and/or destination criteria may be entered to provide further granularity in targeting the access policy in addition to the custom attributes.

In one example, the graphical user interface elements 400, 500, 600, and 700 may be displayed on one or more display screens of one or more computing devices. For instance, the element 400 may be displayed on a computing device of a user of the virtual machine, which the user would like to associate with custom attributes. The elements 500, 600, and 700 may be displayed on a computing device of a security administrator tasked with implementing network security policies based on custom attributes.

Referring now to FIG. 8, an example host map 800 associates the network addresses of virtual machines with the custom attributes assigned to those virtual machines. With reference to the system 100 described in FIG. 1, the host map 800 is one implementation of the host map 116. The host map 800 includes entries associating a network address 802 with a custom attribute type 804 having an attribute value 806 that was gathered by the source attribute agent 808. The entry 810 associates the virtual machine at the network address 169.254.107.176 with custom attribute "role" with a value of "Developer" as gathered by the attribute agent "vmagent." The entry 820 associates the same virtual machine at the network address 169.254.107.176 with custom attribute "project" with a value of "Alpha" as gathered by the attribute agent "vmagent."

Similarly, the entry 830 associates the virtual machine at the network address 169.254.59.151 with custom attribute "role" with a value of "Developer." The entry 840 associates the virtual machine at the network address 10.15.28.34 with custom attribute "role" with a value of "Developer." The entry 850 associates the virtual machine at the network address 10.15.28.32 with custom attribute "role" with a value of "Developer." The entry 860 associates the virtual machine at the network address 10.15.28.31 with custom attribute "role" with a value of "Tester."

Additionally, the entry 870 associates the virtual machine at the network address 10.15.27.133 with custom attribute "role" with a value of "Build." The entry 880 associates the virtual machine at the network address 10.15.27.135 with custom attribute "role" with a value of "Build." The entry 850 associates the virtual machine at the network address 10.15.27.134 with custom attribute "role" with a value of "Build."

The host map 800 is an example in which a user assigns the custom role of "Developer" to four virtual machines, the custom role of "Tester" to one virtual machine, and the custom role of "Build" to three virtual machines. For instance, the four Developer virtual machines may be assigned to different users who produce source code files. The Developer virtual machines send the source code files to the Build virtual machines to convert the source code files into software builds. The Tester virtual machine may be assigned to a user who tests the software builds from the Build machines. In this case, the Developer machines should be permitted to send network traffic to the Build machines, but the Tester machines do not necessarily need to be able to send traffic to the Build machines. Network security policies may be implemented to enable these user-defined categories of virtual machines to communicate accordingly. The host map 800 enables the security platform to track the virtual machines as their access information (e.g., network address) changes in a dynamic virtual environment.

Referring now to FIG. 9, with continued reference to the example described in FIG. 8, an example ACL 900 implements network security policies based on permitting the Developer virtual machines to communicate with the Build virtual machines at the network addresses stored in the host map 800, and denying network traffic from the Tester virtual machine to the Build virtual machines. With reference to the system 100 described in FIG. 1, the ACL 900 is one implementation of the ACL 118. The ACL 900 includes entries that associate a source network address 902 and a destination network address 904 with a rule 906. The entries 910, 912, and 914 permit network traffic from the Developer virtual machine at the network address 169.254.107.176 to the Build virtual machines at the network addresses 10.15.27.133, 10.15.27.135, and 10.15.134, respectively.

Similarly, the entries 920, 922, and 924 permit network traffic from the Developer virtual machine at the network address 169.254.59.151 to the Build virtual machines at the network addresses 10.15.27.133, 10.15.27.135, and 10.15.134, respectively. The entries 930, 932, and 934 permit network traffic from the Developer virtual machine at the network address 10.15.28.34 to the Build virtual machines at the network addresses 10.15.27.133, 10.15.27.135, and 10.15.134, respectively. The entries 940, 942, and 944 permit network traffic from the Developer virtual machine at the network address 10.15.28.32 to the Build virtual machines at the network addresses 10.15.27.133, 10.15.27.135, and 10.15.134, respectively.

The entries 950, 952, and 954 deny network traffic from the Tester virtual machine at the network address 10.15.28.31 to the Build virtual machines at the network addresses 10.15.27.133, 10.15.27.135, and 10.15.134, respectively. These ACL entries prevent the Tester machine from sending the Build machines any data, which may have affected the software builds generated on the Build machines.

Figure 10:
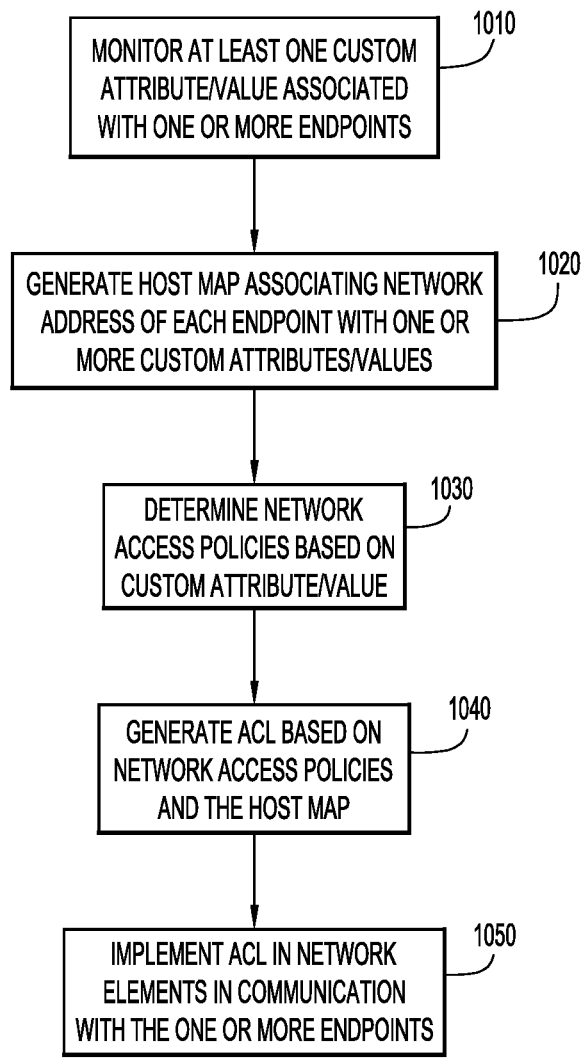
FIG. 10 is a flow chart illustrating the operations performed by a security platform in implementing network security policies based on custom attributes of virtual machines, according to an example embodiment.

Referring now to FIG. 10, a flow chart is shown that illustrates operations performed by a security platform (e.g., security device 110) in a process 1000 for implementing network access policies based on custom attributes. In step 1010, the security platform monitors at least one custom attribute and corresponding attribute value associated with one or more endpoints. In one example, the security platform generates an attribute agent that logs into an administration platform that manages virtual machines as the one or more endpoints. In step 1020, the security platform generates a host map that associates a network address of each endpoint with one or more of the custom attributes and corresponding attribute values. In one example, the attribute agent receives a binding update including a network address of a virtual machine that has been assigned a custom attribute and corresponding attribute value. The custom attribute and corresponding value may be parsed from a user-defined text field associated with the virtual machine.

In step 1030, the security platform determines network access policies based on the at least one custom attribute and corresponding attribute value. In one example, the network access policy may permit or deny network traffic between network objects that are associated with particular custom attributes and attribute values. In step 1040, the security platform generates an access control list based on the network access policies and the host map. In one example, the security platform cross-references the network objects in the network access policies with the host map to generate the access control list. In step 1050, the security platform implements the access control list to control network traffic between the one or more endpoints. In one example, the administration platform managing virtual machines may consult the access control list on the security platform before allowing network traffic between managed virtual machines.

Figure 11:
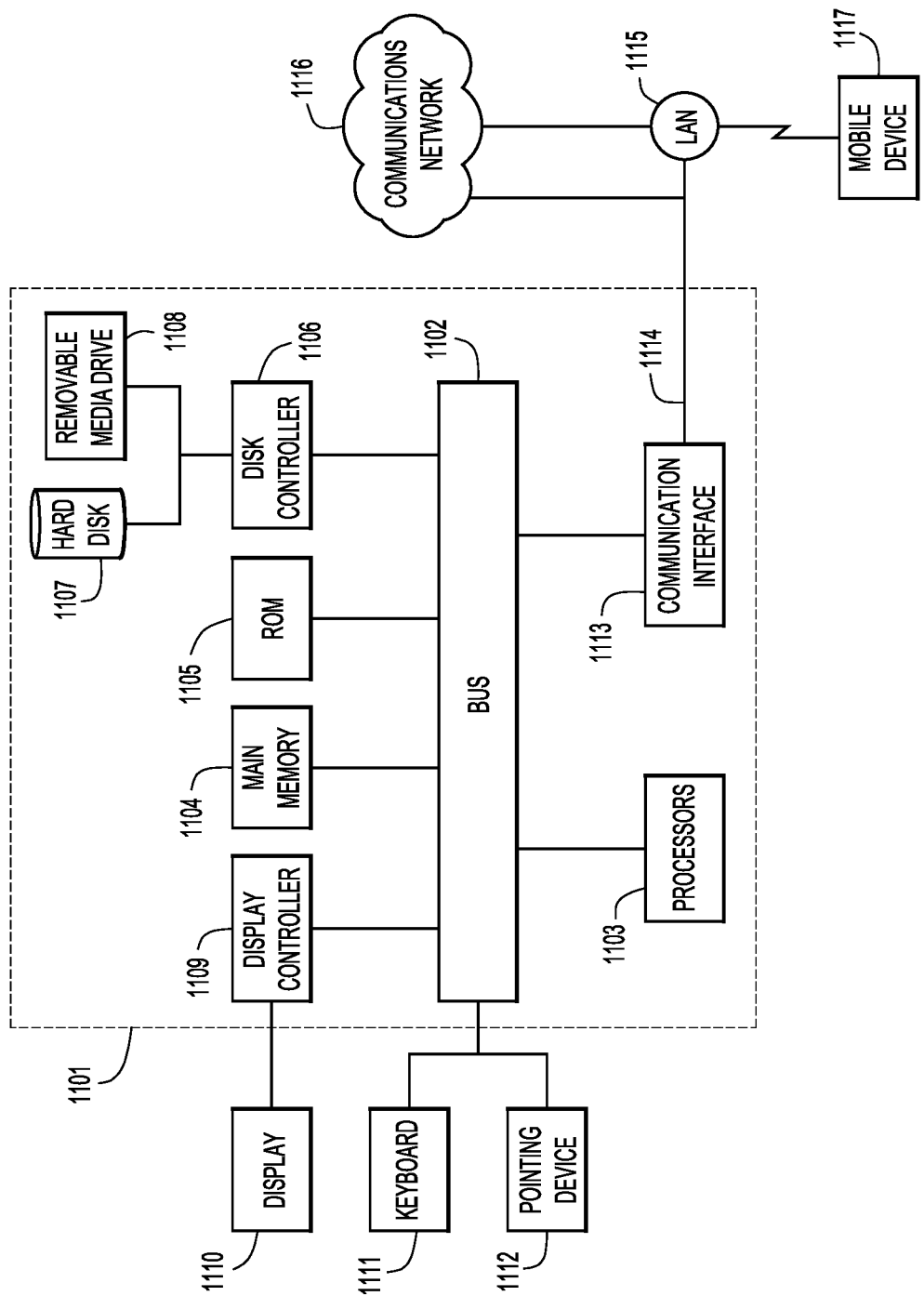
FIG. 11 is a simplified block diagram of a device that may be configured to perform methods presented herein, according to an example embodiment.

Referring now to FIG. 11, an example of a block diagram of a computer system 1101 that may be representative of the security device 110 in which the embodiments presented may be implemented is shown. The computer system 1101 may be programmed to implement a computer based device, such as a security device in a network security policy system based on custom attributes. The computer system 1101 includes a bus 1102 or other communication mechanism for communicating information, and a processor 1103 coupled with the bus 1102 for processing the information. While the figure shows a single block 1103 for a processor, it should be understood that the processors 1103 may represent a plurality of processing cores, each of which can perform separate processing. The computer system 1101 also includes a main memory 1104, such as a random access memory (RAM) or other dynamic storage device (e.g., dynamic RAM (DRAM), static RAM (SRAM), and synchronous DRAM (SD RAM)), coupled to the bus 1102 for storing information and instructions to be executed by processor 1103. In addition, the main memory 1104 may be used for storing temporary variables or other intermediate information during the execution of instructions by the processor 1103.

The computer system 1101 further includes a read only memory (ROM) 1105 or other static storage device (e.g., programmable ROM (PROM), erasable PROM (EPROM), and electrically erasable PROM (EEPROM)) coupled to the bus 1102 for storing static information and instructions for the processor 1103.

The computer system 1101 also includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive, solid state drive, etc.). The storage devices may be added to the computer system 1101 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 1101 may also include a display controller 1109 coupled to the bus 1102 to control a display 1110, such as a cathode ray tube (CRT), liquid crystal display (LCD) or light emitting diode (LED) display, for displaying information to a computer user. The computer system 1101 includes input devices, such as a keyboard 1111 and a pointing device 1112, for interacting with a computer user and providing information to the processor 1103. The pointing device 1112, for example, may be a mouse, a trackball, track pad, touch screen, or a pointing stick for communicating direction information and command selections to the processor 1103 and for controlling cursor movement on the display 1110. In addition, a printer may provide printed listings of data stored and/or generated by the computer system 1101.

The computer system 1101 performs a portion or all of the processing steps of the operations presented herein in response to the processor 1103 executing one or more sequences of one or more instructions contained in a memory, such as the main memory 1104. Such instructions may be read into the main memory 1104 from another computer readable storage medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the computer system 1101 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1101, for driving a device or devices for implementing the operations presented herein, and for enabling the computer system 1101 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a wired or wireless network interface card to attach to any packet switched (wired or wireless) LAN. As another example, the communication interface 1113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices.

For example, the network link 1114 may provide a connection to another computer through a local area network 1115 (e.g., a LAN) or through equipment operated by a service provider, which provides communication services through a communications network 1116. The local network 1114 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the computer system 1101 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1101 can transmit and receive data, including program code, through the network(s) 1115 and 1116, the network link 1114 and the communication interface 1113. Moreover, the network link 1114 may provide a connection through a LAN 1115 to a mobile device 1117 such as a personal digital assistant (PDA), tablet computer, laptop computer, or cellular telephone.

In summary, the techniques presented herein enable user-defined attributes to characterize virtual machines in a hypervisor environment. A security product retrieves the custom attribute information and uses the attribute information to create access control lists for network security policies based on one or more of these custom attributes. Security policies based on these custom attributes may be automatically applied to any virtual machines with a particular attribute type/value, and the access control lists may be changed without reconfiguring the security platform policies.

The techniques presented enable a user to define attributes using a platform-independent format, such as XML, to represent any desired categorization of managed objects. Any hypervisor environment that allows user-defined data to be assigned to a managed object may use the custom attribute system described herein. No additional modification to the hypervisor functionality is required to support the custom attribute system. The techniques described herein free the user from defining security policies based on networking characteristics, such as IP addresses. This allows the administrative platform to add, move, or re-task virtual machines without reconfiguring the security policies on the security platform. The architecture of the network security policy system may be extended to support any type of hypervisor environment and the collection and management of other types of virtual machine attributes not directly associated with security policy management.

In particular, the use of a well-known protocol, such as XML, to define virtual machine attributes removes any dependency on a proprietary protocol. This design also allows virtual machine attributes of multiple types (e.g., ACL policy, service policy, etc.) to be specified together using a common format. The multiple types of virtual machine attributes may be used to create multiple policy types from the same set of attributes. Additionally, the custom attributes may be opaque to, and independent of, the hypervisor.

In one form, a method is provided for a security device to implement network service policies based on custom attributes assigned to endpoints. The method includes monitoring at least one custom attribute and corresponding attribute value associated with one or more endpoints. The security device generates a host map associating a network address of each endpoint with one or more of the custom attributes and corresponding attribute values. The security device determines network access policies based on the at least one custom attribute and corresponding attribute value. The security device generates an access control list based on the network access policies and the host map, and implements the access control list to control network traffic between the one or more endpoints.

In another form, an apparatus is provided comprising a network interface unit and a processor. The network interface unit is configured to communicate with one or more endpoints. The processor is configured to monitor at least one custom attribute and corresponding attribute value associated with the one or more endpoints. The processor is also configured to generate a host map associating a network address of each endpoint with one or more of the custom attributes and corresponding attribute values. The processor is additionally configured to determine network access policies based on the at least one custom attribute and corresponding attribute value. The processor is further configured to generate an access control list based on the network access policies and the host map, and implement the access control list to control network traffic between the one or more endpoints.

In a further form, a non-transitory computer readable storage media is provided that is encoded with instructions that, when executed by a processor in a computing device, cause the processor to monitor at least one custom attribute and corresponding attribute value associated with one or more endpoints. The instructions cause the processor to generate a host map associating a network address of each endpoint with one or more of the custom attributes and corresponding attribute values. The instructions also cause the processor to determine network access policies based on the at least one custom attribute and corresponding attribute values. The instructions further cause the processor to generate an access control list based on the network access policies and the host map, and implement the access control list to control network traffic between the one or more endpoints.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   at a security device, monitoring at least one custom attribute and corresponding attribute value associated with one or more first endpoints, wherein the at least one custom attribute and corresponding attribute value are defined in a user-defined field at each of the one or more first endpoints, and wherein the at least one custom attribute and corresponding attribute value for each of the one or more first endpoints are stored at an administrative platform that does not interpret the at least one custom attribute and corresponding attribute value;

generating a host map associating a network address of each of the one or more first endpoints with one or more of the custom attributes and corresponding attribute values;

determining network access policies between the one or more first endpoints and a second endpoint based on the at least one custom attribute and corresponding attribute value;

generating an access control list for network traffic between the one or more first endpoints and the second endpoint based on the network access policies and the host map; and implementing the access control list to control the network traffic between the one or more first endpoints and the second endpoint.

2. The method of claim 1, wherein the one or more first endpoints comprise one or more virtual machines instantiated on a hypervisor.

3. The method of claim 1, wherein the second endpoint defines another custom attribute and attribute value in the user-defined field associated with the second endpoint.

4. The method of claim 1, wherein monitoring includes a security agent function of the security device logging in to the administrative platform and retrieving a particular user-defined field associated with a particular endpoint.

5. The method of claim 4, wherein monitoring includes the security agent function parsing the particular user-defined field associated with the particular endpoint.

6. The method of claim 4, further comprising decoding the at least one custom attribute and corresponding attribute value associated with the particular endpoint from the particular user-defined field.

7. The method of claim 1, further comprising:
receiving a notification that a particular endpoint has changed one of its network address, its custom attribute, or its corresponding attribute value;
updating the host map based on the notification; and
updating the access control list based on the updated host map.

8. An apparatus comprising:
a network interface unit configured to communicate with one or more first endpoints; and
a processor configured to:
monitor at least one custom attribute and corresponding attribute value associated with the one or more first endpoints, wherein the at least one custom attribute and corresponding attribute value are defined in a user-defined field at each of the one or more first endpoints, and wherein the at least one custom attribute and corresponding attribute value for each of the one or more first endpoints are stored at an administrative platform that does not interpret the at least one custom attribute and corresponding attribute value;
generate a host map associating a network address of each of the one or more first endpoints with one or more of the custom attributes and corresponding attribute values;
determine network access policies between the one or more first endpoints and a second endpoint based on the at least one custom attribute and corresponding attribute value;
generate an access control list for network traffic between the one or more first endpoints and the second endpoint based on the network access policies and the host map; and
implement the access control list to control the network traffic between the one or more first endpoints and the second endpoint.

9. The apparatus of claim 8, wherein the one or more first endpoints comprise one or more virtual machines instantiated on a hypervisor.

10. The apparatus of claim 8, wherein the processor is further configured to determine another custom attribute and attribute value in the user-defined field associated with the second endpoint.

11. The apparatus of claim 8, wherein processor is further configured to direct a security agent function to monitor the at least one custom attribute and corresponding attribute value by logging in to the administrative platform and retrieving a particular user-defined field associated with a particular endpoint.

12. The apparatus of claim 11, wherein the processor is further configured to direct the security agent function to parse the particular user-defined field to monitor the at least one custom attribute and corresponding attribute value associated with the particular endpoint.

13. The apparatus of claim 11, wherein the processor is further configured to decode the at least one custom attribute and corresponding attribute value associated with the particular endpoint from the particular user-defined field.

14. The apparatus of claim 8, wherein the processor is further configured to:
receive via the network interface unit, a notification that a particular endpoint has changed one of its network address, its custom attribute, or its corresponding attribute value;
update the host map based on the notification; and
update the access control list based on the updated host map.

15. One or more non-transitory computer readable storage media encoded with computer executable instructions operable to cause a processor in a computing device to:
monitor at least one custom attribute and corresponding attribute value associated with one or more first endpoints, wherein the at least one custom attribute and corresponding attribute value are defined in a user-defined field at each of the one or more first endpoints, and wherein the at least one custom attribute and corresponding attribute value for each of the one or more first endpoints are stored at an administrative platform that does not interpret the at least one custom attribute and corresponding attribute value;
generate a host map associating a network address of each of the one or more first endpoints with one or more of the custom attributes and corresponding attribute values;
determine network access policies between the one or more first endpoints and a second endpoint based on the at least one custom attribute and corresponding attribute value;
generate an access control list for network traffic between the one or more first endpoints and the second endpoint based on the network access policies and the host map; and implement the access control list to control the network traffic between the one or more first endpoints and the second endpoint.

16. The non-transitory computer readable storage media of claim 15, wherein the one or more first endpoints comprise one or more virtual machines instantiated on a hypervisor.

17. The non-transitory computer readable storage media of claim 15, further comprising instructions operable to cause the processor to determine another custom attribute and attribute value in the user-defined field associated with the second endpoint.

18. The non-transitory computer readable storage media of claim 15, further comprising instructions operable to cause the processor to direct a security agent function to monitor the at least one custom attribute and corresponding attribute value by:

logging in to the administrative platform;
 retrieving a particular user-defined field associated with a particular endpoint; and
 parsing the particular user-defined field for the at least one custom attribute and corresponding attribute value.

19. The non-transitory computer readable storage media of claim 18, further comprising instructions operable to cause the processor to decode the at least one custom attribute and corresponding attribute value associated with the particular endpoint from the user-defined field.

20. The non-transitory computer readable storage media of claim 15, further comprising instructions operable to cause the processor to:

receive a notification that a particular endpoint has changed one of its network address, its custom attribute, or its corresponding attribute value;
 update the host map based on the notification; and
 update the access control list based on the updated host map.

* * * * *